US006675638B2

(12) United States Patent
Pfitz

(10) Patent No.: US 6,675,638 B2
(45) Date of Patent: Jan. 13, 2004

(54) SCANNING METHOD FOR PRESSURE SENSORS USED IN THE PRESSURE-BASED DETECTION OF FILLING LEVELS

(75) Inventor: Manfred Pfitz, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 82 days.

(21) Appl. No.: 10/030,644

(22) PCT Filed: May 2, 2001

(86) PCT No.: PCT/DE01/01635

§ 371 (c)(1), (2), (4) Date: Jun. 3, 2002

(87) PCT Pub. No.: WO01/83968

PCT Pub. Date: Nov. 8, 2001

(65) Prior Publication Data

US 2002/0170345 A1 Nov. 21, 2002

(30) Foreign Application Priority Data

May 4, 2000 (DE) ........................................ 100 21 647

(51) Int. Cl.[7] .............................................. G01M 15/00
(52) U.S. Cl. ........................................................ 73/115
(58) Field of Search ............................... 73/116, 117.2, 73/117.3, 118.1, 115; 123/419, 425, 435, 568.11, 704

(56) References Cited

U.S. PATENT DOCUMENTS

| | | | | |
|---|---|---|---|---|
| 4,991,554 A | | 2/1991 | Wataya | |
| 5,616,834 A | * | 4/1997 | Lynch et al. | 73/116 |
| 5,715,794 A | * | 2/1998 | Nakamura et al. | 123/425 |
| 6,234,012 B1 | * | 5/2001 | Lewis et al. | 73/118.1 |

FOREIGN PATENT DOCUMENTS

| | | |
|---|---|---|
| DE | 197 41 820 | 3/1999 |
| DE | 199 00 738 | 6/2000 |
| WO | WO 95 16196 | 6/1995 |

* cited by examiner

*Primary Examiner*—Kamand Cuneo
*Assistant Examiner*—Monica D. Harrison
(74) *Attorney, Agent, or Firm*—Kenyon & Kenyon

(57) ABSTRACT

A method for sampling a sensor that receives a pressure signal, the pressure signal being used as a basis for a pressure signal-based cylinder charge calculation for calculating the fresh-gas charge of cylinders of an internal combustion engine. At the instant at which an intake valve closes at a respective cylinder of the internal combustion engine, the pressure signal is received multiple times in succession in a sampling sequence of individual impulses.

7 Claims, 4 Drawing Sheets

SCANNING METHOD FOR PRESSURE SENSORS USED IN THE PRESSURE-BASED DETECTION OF FILLING LEVELS

FIELD OF THE INVENTION

The present invention relates to a method for sampling a sensor that receives a pressure signal, the pressure signal being used as a basis for a pressure signal-based cylinder charge calculation for calculating a fresh-gas charge of a cylinder of an internal combustion engine.

BACKGROUND INFORMATION

When using sampling methods for sensor-supported, pressure-based charge determination, a pressure sensor may be sampled every 1 ms, and the sampled values may be subsequently added over a segment. The sum of the sampled values may be divided by the number of samplings, so that an arithmetic average is obtained that may permit a charge calculation on the basis of each partial pressure of residual gas and fresh gas of a cylinder of an internal combustion engine.

A pressure sensor that senses pressure signals may be sampled continuously every 1 ms, and an averaging may subsequently be performed between two firings (segment). The obtained values may be used to determine the total partial pressure, which consists of the partial residual-gas pressure and the partial fresh-gas pressure. Determining the total partial pressure and the charge that is dependent thereon at the individual cylinders of an internal combustion engine may only yield accurate values when the pulsation amplitude is symmetrical, to carry out a charge determination calculated indirectly by the induction-manifold pressure. In practice, the pulsation shapes that may occur at the instant at which the intake valve closes may be extremely unsymmetrical. Thus, an arithmetic averaging to determine the fresh-gas charge in the cylinder may produce inaccurate results. Due to sporadically occurring interferences, sampling every 1 ms may be significantly more sensitive than averaging. These interferences may be caused, for example, by electromagnetic influences (EMC). Such an electrical interference pulse may occur, for example, during a cold start and may corrupt the measuring result of the pressure sensor, thereby yielding an inaccurate charge calculation for the cylinder of the internal combustion engine. This may result in bad cold start performance, as well as a significant, yet avoidable, increase in emissions during the starting phase, which may seriously pollute the environment.

As a result of interfering pulses, such as, for example, those occurring during a cold start or those due to EMC influences, sampling the pressure sensor every 1 ms may result in incorrect pressure information for the fresh-gas charge calculation, since the determined partial pressures may be inaccurate and the actual conditions may not be correctly represented.

SUMMARY OF THE INVENTION

With an exemplary embodiment and/or exemplary method according to the present invention, the total partial pressure at the individual cylinders of an internal combustion engine may be measured multiple times in succession, shortly prior to the instant when the "intake valve closes" (ES) . The sampled values are divided by the number of samplings and a representative average pressure reflecting the actual conditions may be, consequently, available for further processing. The fresh-gas charge in the cylinder may be calculated on the basis of a representative average pressure determined in such a manner. As a result of the increased number of samplings of the pressure at the instant at which the "intake valve closes" (ES), the induction-manifold pressure, determined in the induction manifold of the internal combustion engine, corresponds to the total partial pressure prevailing in the cylinder. Since a large number of samplings may be performed in quick succession, during the abovementioned time, potential false samplings caused by EMC or other interfering pulses during the cold starting phase may be disregarded, so that inaccurate and corrupted pressure information will not enter the fresh-gas charge calculation.

It is believed that an advantage of an exemplary embodiment and/or exemplary method of the present invention involves the fact that, in engines having a large ratio of cylinder/induction manifold volumes (that is, in the case of an extremely small induction manifold), the damping effect of the induction manifold with regard to intake-air pulsations may be greatly reduced. A fresh-gas calculation using the induction-manifold pressure may not be possible in this case, since, in a steady state, the pressure signal exhibits pulsations that may be too great.

DETAILED DESCRIPTION

Figure 1:
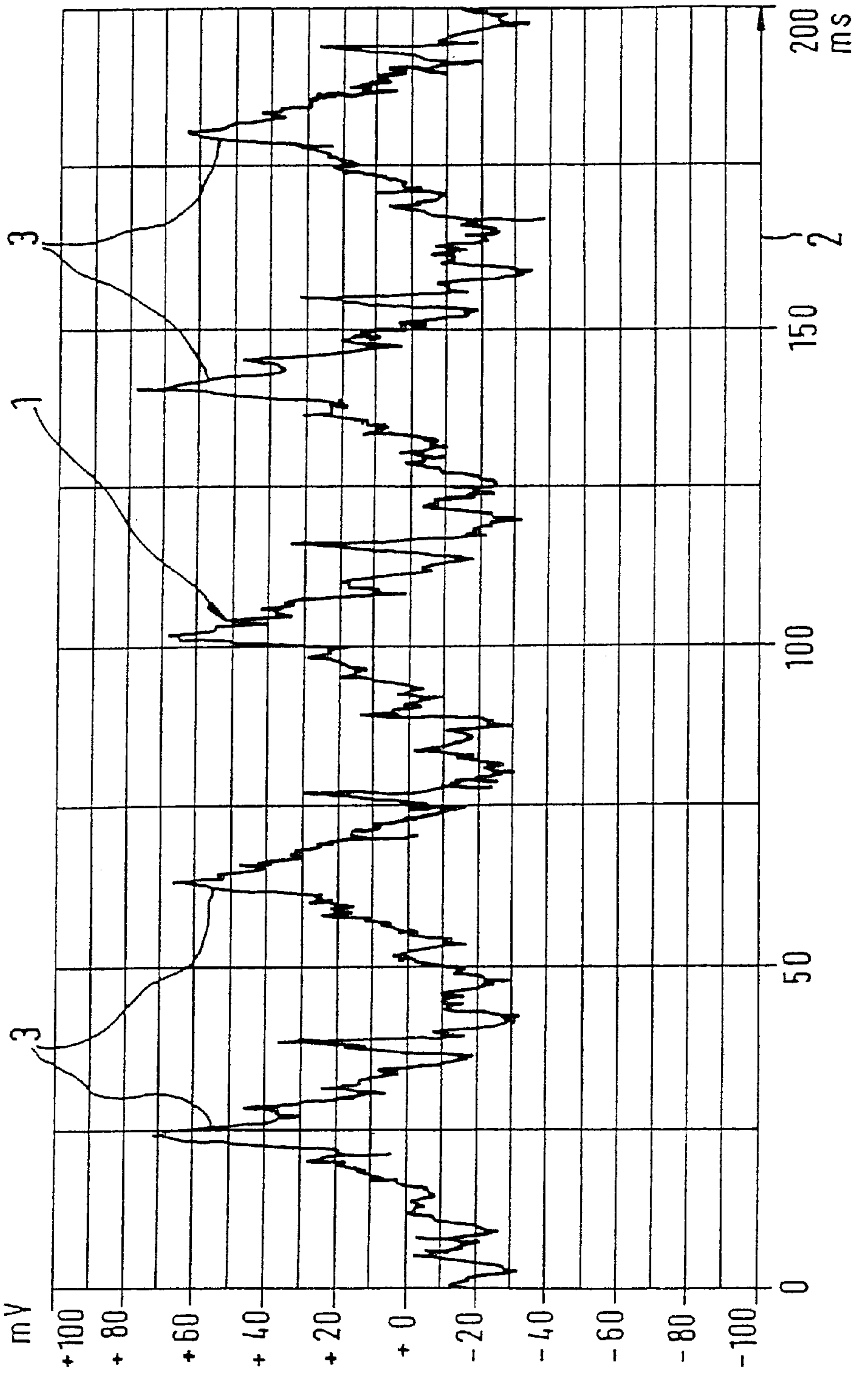
FIG. 1 shows a signal characteristic of a pressure sensor signal plotted as a function of time.

FIG. 1 shows a signal characteristic of a pressure sensor signal plotted as a function of time.

The signal characteristic of pressure sensor signal 1 is plotted in [mV] over time axis 2. Time axis 2 is scaled in [ms]. Amplitude 3 of the pressure sensor signal 1 is also shown. The pulsation shape of pressure signal 1 is extremely asymmetrically over the time axis, that is, over the crankshaft angle.

Figure 2:
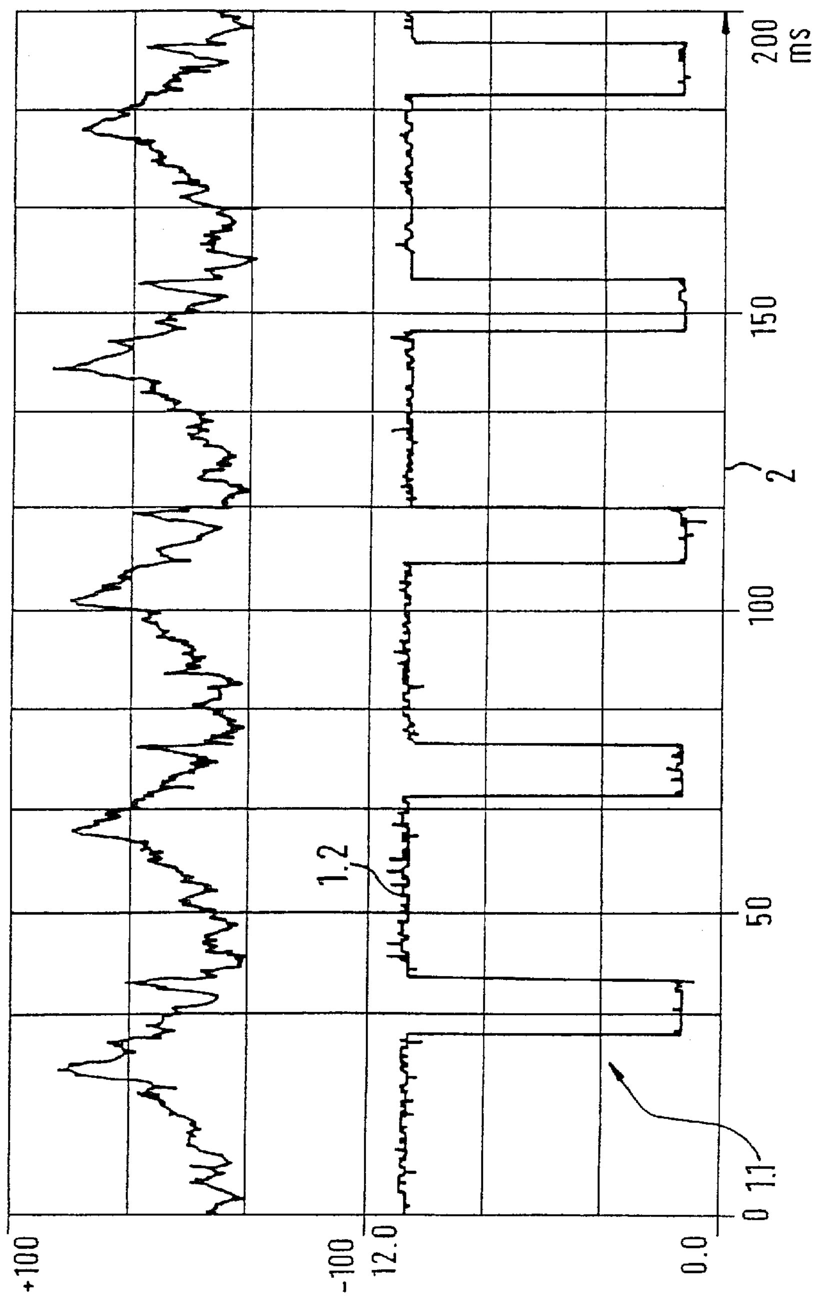
FIG. 2 shows a characteristic of the sampled signal occurring continuously every 1 ms and a reference signal for the crankshaft.

FIG. 2 shows the characteristic of a pressure signal, which is continuously sampled in milliseconds, and shows its relationship to the crankshaft.

The characteristic of the pressure signal over time axis 2 is plotted in the top half of FIG. 2, and characteristic 1.2 of the ms-signal, as well as the relationship to the crankshaft, is plotted in the bottom half of FIG. 2.

Figure 3:
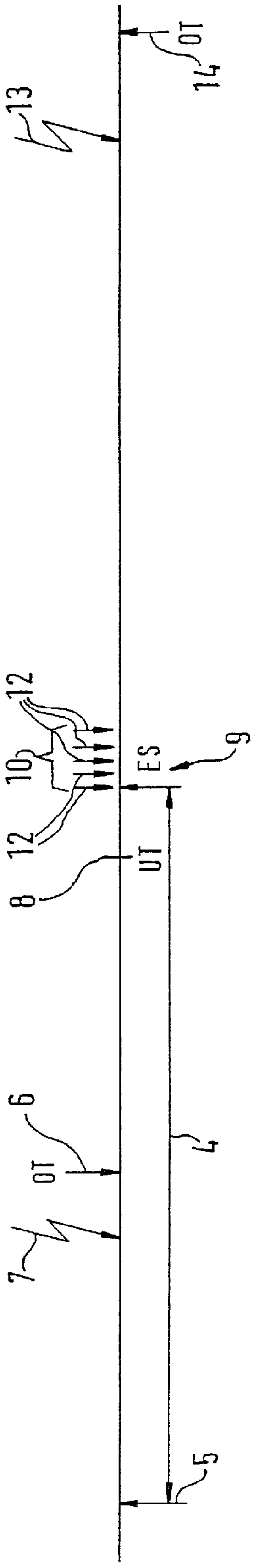
FIG. 3 shows the generation of a sampled signal packet at the instant at which the "intake valve closes," plotted over the crankshaft angle.

FIG. 3 shows the generation of a sampled signal packet at the instant at which the "intake valve closes," plotted over the crankshaft angle.

The horizontal line representing the characteristic of the crankshaft revolution is provided with reference mark 5 (GRD value) for a first cylinder of an internal combustion engine. Starting from this value, which corresponds to a specific angular position of the crankshaft, a software counter 4, which may be implemented in control electronics, counts the crankshaft angle at which the intake valve of the cylinder in question of the internal combustion engine closes. This instant is identified by reference numeral 9.

During the time span from reference mark 5 to the instant at which the intake valve of the cylinder in question of the internal combustion engine closes, the compressed fuel/air mixture at the first cylinder is fired, and the piston of the cylinder travels from top dead center 6 to bottom dead center 8. At this point, the fuel/air mixture is no longer drawn in, and instant 9 is then reached, at which time the intake valve(s) in question at the cylinder is/are closed.

During this procedure, the total partial pressure of the cylinder in question is sampled multiple times in succession and corresponding pressure signals are received. Sampling sequence 10, which covers sampling range at instant 9 at which the intake valve closes, such as, for example, by a microcontroller including a quartz frequency of 24 MHz, generates and allows sampling sequence 10 of individual impulses 12, which may only be separated by 160 μs. Compared to sampling every 1 ms, sampling intervals of 160 μs may be used, so that the pressure signal per cylinder of the internal combustion engine may be sampled 6 times more frequently than in other applications.

The sampled signals may be weighted differently when calculated and evaluated in a microcontroller including a quartz frequency of 24 MHz, for example. When averaging, the pressure signals may, therefore, be weighted differently at instant 9, that is, when the intake valve closes, in a calculation of the charge determination of the cylinder in question. The signals that may be particularly early with regard to closing instant 9 of the intake valve or those signals that may be late may be weighted to a lesser degree when averaging in the microcontroller than those signals obtained immediately prior to the actual closing instant of the intake valve. These signals correspond with a high degree of accuracy to the actual total partial pressure in the corresponding cylinder of the internal combustion engine.

When averaging, these signals may then be given more consideration in the calculation of the actual total partial pressure in the cylinder of the internal combustion engine. Individual sampled signals 12, which may be received every 160 μs, may be averaged in the pressure controller at analog-to-digital ("A/D") conversion times of approximately 10 μs, and this may be carried out, such that all signal values enter the average value calculation with uniform weighting. False sampled information may be, consequently, prevented from invalidating the determined average value results, and a pressure signal that may be corrupted, in particular, during the cold starting phase, by sporadically occurring interferences or EMC influences, may be prevented from entering the fresh-gas charge calculation.

As shown in FIG. 3, as the crankshaft further revolves about its crankshaft axis, the compressed fuel/air mixture is fired in an additional cylinder, namely in cylinder 2 of the internal combustion engine, the ignition firing point of cylinder 2 being designated by reference numeral 13. The ignition firing point is several crankshaft-angle degrees before the top dead center of cylinder 2 of the internal combustion engine, the top dead center of cylinder 2 being designated by reference numeral 14 in FIG. 3.

Figure 4:
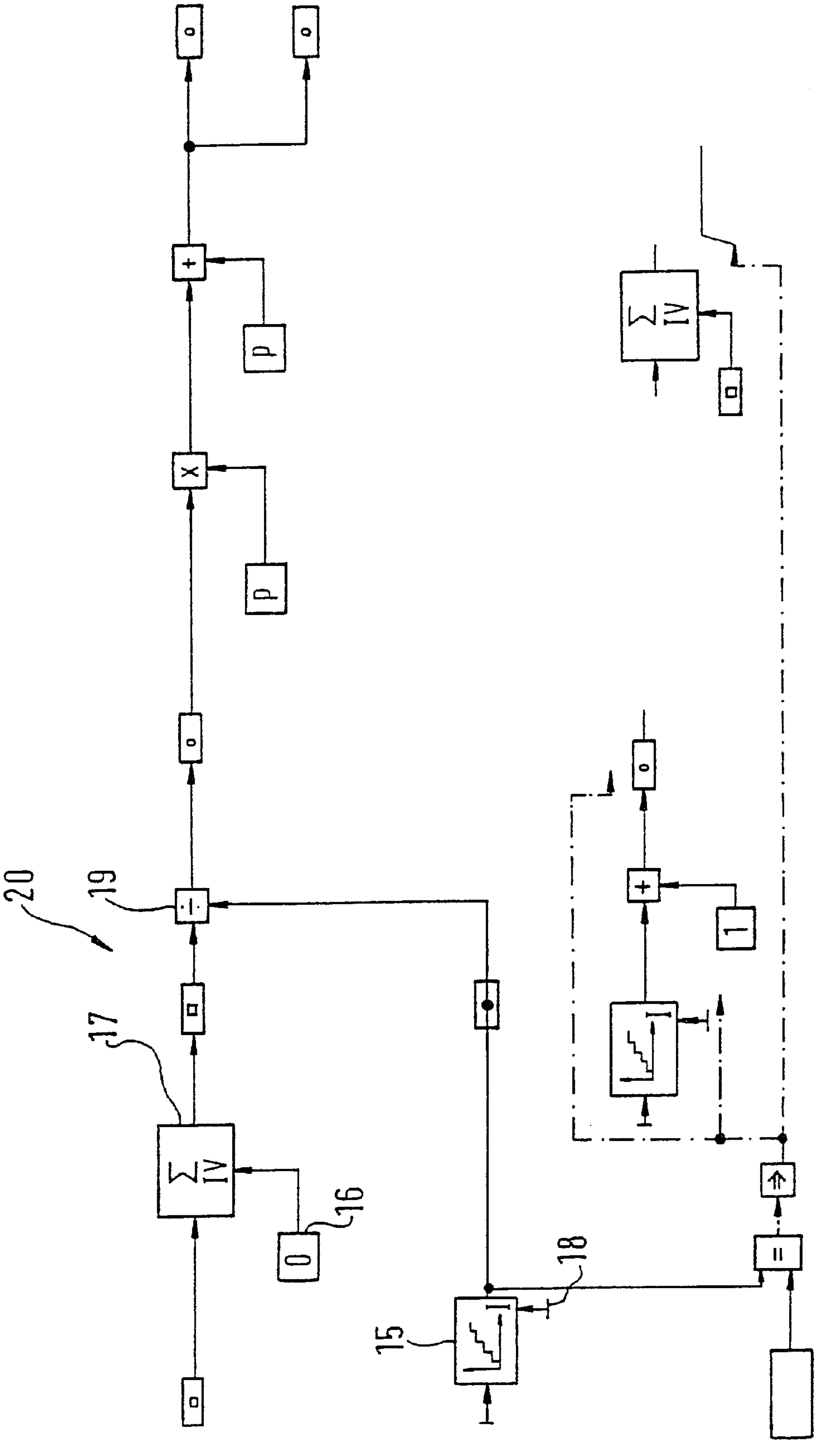
FIG. 4 shows an averaging over 1 segment (time between two firings).

FIG. 4 shows a 1 ms sampling with averaging over 1 segment.

In FIG. 4, all of the pressure signals obtained by the sensor are added together in a summation unit 17. Summation unit 17 may be reset to a value 0 by a reset element 16. The number of determined individual samplings 12, within sampling sequence 10, may be received by an electronically implemented counting device 15. Counting device 15 may also be provided with a reset element 18. The signals of counting device 15, as well as those of summation unit 17, are communicated to an averaging step 19, in which an averaging is performed either with weighting or arithmetically. In a weighted averaging, those signals near the actual closing instant of the intake valve are given more consideration than those further away from the actual closing instant of the intake valve. In an arithmetic averaging, the obtained pressure values are divided by the number of determined individual impulses 12.

However, within this functional framework 20, an averaging may be performed on the basis of a higher number of actual pressure signals representing the total partial pressure ratio at the cylinder. Thus, average values obtained in such a manner may be significantly more meaningful and may reflect an image of the actual conditions existing at the cylinder in question, whose fresh-gas charge is to be calculated. An exemplary method according to the present invention may significantly increase the sampling frequency at exactly the critical instant, that is, at closing instant 9 of the intake valve of the cylinder in question of the internal combustion engine. Furthermore, averaging may effectively eliminate interference signals and signals occurring only sporadically that may significantly distort a measuring result.

The references in the Figures include the following: 1. Signal characteristic of the pressure sensor signal; 1.1 1-mssignal; 2. Time axis; 3. Amplitude; 4. Software counter; 5. Reference mark (GRD value); 6. Top dead center of cylinder 1; 7. Ignition firing point of cylinder 1; 8. Bottom dead center of cylinder 1; 9. Closing instant of the intake valve; 10. Sampling sequence; 11. Sampling region; 12. Individual impulse; 13. Ignition firing point of cylinder 2; 14. Top dead center of cylinder 2; 15. Counter for the number of samplings; 16. Reset element after the segment end; 17. Summing unit; 18. Reset element after the segment end; 19. Averager; and 20. Functional framework.

What is claimed is:

1. A method for sampling a pressure sensor, comprising:

receiving a plurality of pressure signals from a sampling sequence of pressure samplings, wherein the sequence begins at an instant of a closing of an intake valve of a corresponding cylinder and the sequence ends prior to a firing of the cylinder, and wherein a representative speed value for calculating a fresh-gas charge in the cylinder is available from a number of the samples within the sampling sequence.

2. The method of claim 1, wherein the sampling sequence is generated after a time span elapses after a reference mark.

3. The method of claim 1, wherein the sampling sequence is generated after passing bottom dead center of the cylinder.

4. The method of claim 1, wherein a total partial pressure in the cylinder is received multiple times in succession, shortly prior to the instant at which the intake valve closes.

5. The method of claim 1, wherein a number of the samples within the sampling sequence depends on a fundamental pulsation of the internal combustion engine.

6. The method of claim 1, wherein a sampling period of the samples within the sampling sequence is 160 μs.

7. A method for sampling a pressure sensor, comprising:

receiving a plurality of pressure signals from a sampling sequence of pressure samplings, wherein the sequence begins at an instant of a closing of an intake valve of a corresponding cylinder and the sequence ends prior to a firing of the cylinder, and wherein a microcontroller, including a quartz frequency of 24 MHz, is used to generate the sampling sequence at an analog-to-digital conversion time of approximately 10 μs.

* * * * *